United States Patent [19]

Nakamura et al.

[11] Patent Number: 5,174,680

[45] Date of Patent: Dec. 29, 1992

[54] FASTENING APPARATUS FOR A SHAFT AND A WHEEL OR WHEEL-LIKE BODY

[75] Inventors: Kenichiro Nakamura, Otsu; Toyoakira Fukui, Kyoto, both of Japan

[73] Assignee: Tsubakimoto Chain Co., Osaka, Japan

[21] Appl. No.: 775,818

[22] Filed: Oct. 11, 1991

[30] Foreign Application Priority Data

Oct. 12, 1990 [JP] Japan .................. 2-106526[U]

[51] Int. Cl.⁵ .................................................. F16B 7/04
[52] U.S. Cl. ............................... 403/370; 301/111; 403/371
[58] Field of Search ........... 301/1, 9 R, 9 AH, 9 AN, 301/9 DN, 9 S, 105 R, 111, 114-117, 122, 126, 131; 74/405, 406; 403/370, 371, 374

[56] References Cited

U.S. PATENT DOCUMENTS

2,849,886  9/1958  McCloskey .................. 403/371 X
4,304,502  12/1981  Stratienko ..................... 403/370

FOREIGN PATENT DOCUMENTS

15790  8/1956  Fed. Rep. of Germany ...... 301/111
2841854  8/1979  Fed. Rep. of Germany ...... 301/111

*Primary Examiner*—Russell D. Stormer
*Attorney, Agent, or Firm*—Flynn, Thiel, Boutell & Tanis

[57] ABSTRACT

An apparatus for fastening a wheel, having a boss hole therein, to a shaft. The fastening apparatus includes an axially slit outer ring having a cylindrical outer peripheral surface fitted into the boss hole, a tapered inner peripheral surface, a support flange formed at one end of the ring adjacent the small diameter end of the tapered surface for direct engagement with the shaft, a cylindrical inner peripheral surface formed at the large diameter end of the tapered surface, and an enlarged annular end flange formed at the other end of the ring. The fastening apparatus also includes an inner ring having a cylindrical inner peripheral surface for direct engagement with the shaft, a tapered outer peripheral surface complementary to the tapered inner peripheral surface, a cylindrical outer peripheral surface formed at the large diameter end of the tapered outer peripheral surface and complementary to the cylindrical inner peripheral surface of the outer ring, a flange portion enlarged in diameter formed at the large diameter end of the tapered outer peripheral surface, nonthreaded axial holes formed through the flange portion, and an axial slit. Bolts threadedly engage with tapped holes formed in the wheel while extending through the nonthreaded holes.

11 Claims, 4 Drawing Sheets

FASTENING APPARATUS FOR A SHAFT AND A WHEEL OR WHEEL-LIKE BODY

FIELD OF THE INVENTION

The present invention relates to an apparatus for fastening a wheel or wheel-like body to a shaft without using a key.

BACKGROUND OF THE INVENTION

FIGS. 5 and 6 are respectively axial sectional views of conventional fastening apparatuses 50 and 60 for securing a wheel or the like to a shaft. In such a fastening apparatus as described, shoulders 54 and 64 are provided in boss holes 53 and 63 of wheels 52 and 62, respectively, to prevent relative movement between outer rings 51 and 61 and wheels 52 and 62. Wheels 52 and 62 need be provided with relatively long guide or hub portions 56 and 66 in contact with shafts 55 and 65 to prevent an error in angle between the shafts 55 and 65 and the wheels 52 and 62, that is, to provide centering therebetween. However, it is troublesome to machine the shoulders 54 and 64 and the guide portions 56 and 66 on the wheels. Moreover, in mounting the fastening apparatus, attention should be paid to directivity of the wheels 52 and 62.

The aforementioned problem is solved by the present invention which provides an improved apparatus for fastening a wheel or wheel-like body, having a boss hole therein, to a shaft. The fastening apparatus includes an axially slit outer ring having a cylindrical outer peripheral surface fitted into the boss hole, a tapered inner peripheral surface, a support flange formed at one end of the ring adjacent the small diameter end of the tapered inner peripheral surface for direct engagement with the shaft, a cylindrical inner peripheral surface formed at the large diameter end of the tapered inner peripheral surface, and an enlarged annular end flange formed at the other end of the ring. The fastening apparatus also includes an inner ring having a cylindrical inner peripheral surface for direct engagement with the shaft, a tapered outer peripheral surface complementary to the tapered inner peripheral surface of the outer ring, a cylindrical outer peripheral surface formed at the large diameter end of the tapered outer peripheral surface and complementary to the cylindrical inner peripheral surface of the outer ring, a flange portion enlarged in diameter formed at the large diameter end of the tapered outer peripheral surface, nonthreaded axial holes formed through the flange portion, and an axial slit. Bolts threadedly engage with tapped holes formed in the wheel or wheel-like body while extending through the nonthreaded holes.

When bolts are fastened, the outer and inner rings are relatively axially moved. However, since the end flange of the outer ring is in contact with an end face of the wheel, the wheel and the outer ring are prevented from relative axial movement. When the bolts are further fastened, the outer ring and the inner ring are fastened to the wheel and the shaft, respectively, by the wedge action of the tapered surfaces of the outer and inner rings and the respective resilient radial expansion and contraction of the outer and inner rings. As the result, the shaft and the wheel are firmly fastened, and torque can be transmitted therebetween by frictional force.

In the fastening operation, on the side of the small diameter of the tapered surfaces, the support flange on the outer ring comes into contact with the outer peripheral surface of the shaft, and the shaft and wheel are subjected to centering. On the side of the large diameter of the tapered surfaces, the shaft and the wheel are subjected to centering by the provision of the cylindrical outer peripheral surface of the outer ring, the cylindrical inner peripheral surface of the outer ring and the cylindrical outer peripheral surface of the inner ring which are complementary to one another, and the cylindrical inner peripheral surface of the inner ring. In the present invention, the boss hole of the wheel can be a circular hole of uniform diameter without requiring shoulders and/or guide portions as in prior art devices. Accordingly, machining is easy, and in mounting, attention need not be paid to the directivity of the wheel.

DETAILED DESCRIPTION

Figure 1:
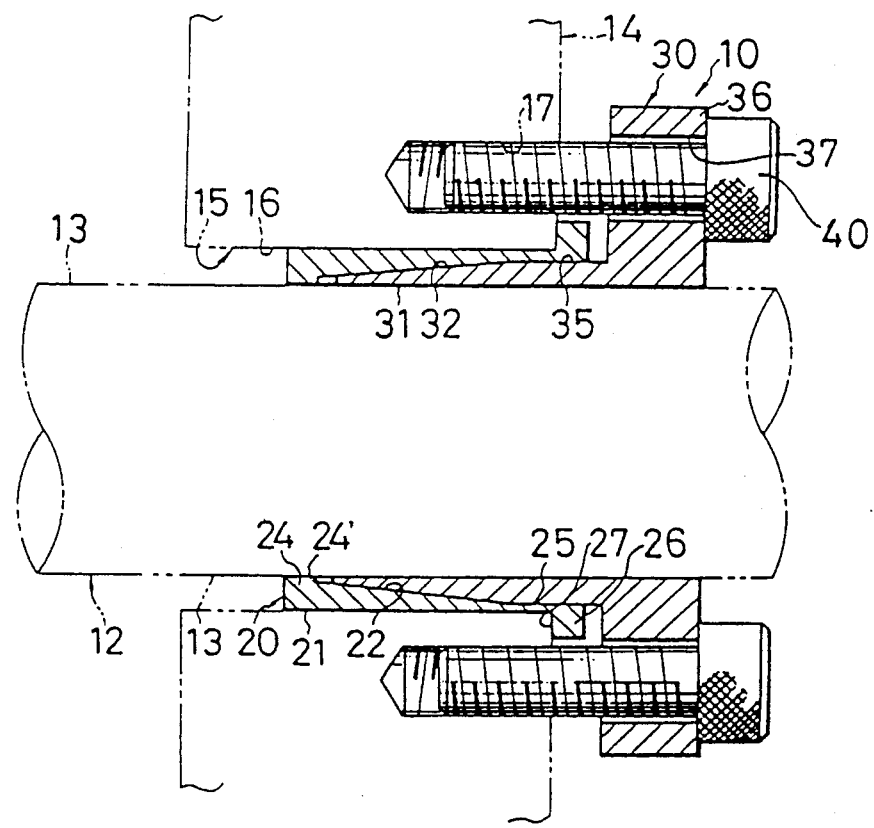
FIG. 1 is an axial sectional view of an embodiment of a fastening apparatus according to the present invention.

FIG. 1 is an axial sectional view of a fastening apparatus 10 according to the present invention for securing a wheel 14 onto a shaft 12. This fastening apparatus 10 comprises a one-piece outer ring 20, a onepiece inner ring 30, and threaded fasteners such as screws or bolts 40.

Figure 3:
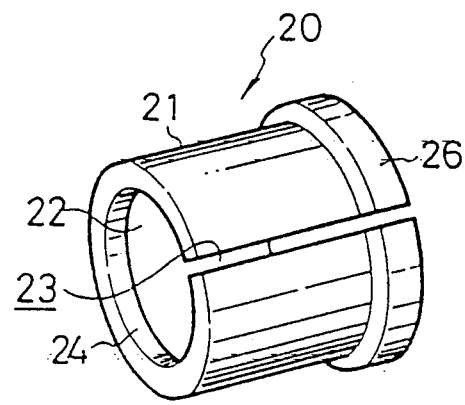
FIG. 3 is a perspective view of an outer ring of the fastening apparatus shown in FIG. 1.

As shown in FIGS. 1 and 3, the outer ring 20 is cylindrical and has a cylindrical outer peripheral surface 21 having a diameter smaller by scores of microns than the inside diameter of a central boss hole 15 as formed in wheel 14, and an axially tapered inner peripheral surface 22 which is of a generally truncated conical configuration. The outer ring 20 has an axially extending-through slit 23. The outer ring 20 further has a radially inwardly projecting support flange or jaw 24 which slips over the shaft 12 and is located at the small diameter end of the tapered inner peripheral surface 22, and also has a cylindrical inner peripheral surface 25 located at the large diameter end of the tapered inner peripheral surface 22. The jaw 24 is formed with a cylindrical inner peripheral surface 24' which is axially parallel with the shaft. Furthermore, the outer ring 20 has an end flange 26 which is enlarged in diameter and is formed on ring 20 at an end thereof opposite from the flange 24. The flange 26 is formed with a seat surface or shoulder 27 perpendicular to the shaft 12. The axial length of the cylindrical inner peripheral surface 25 is longer than the axial thickness of the flange 26.

Figure 2:
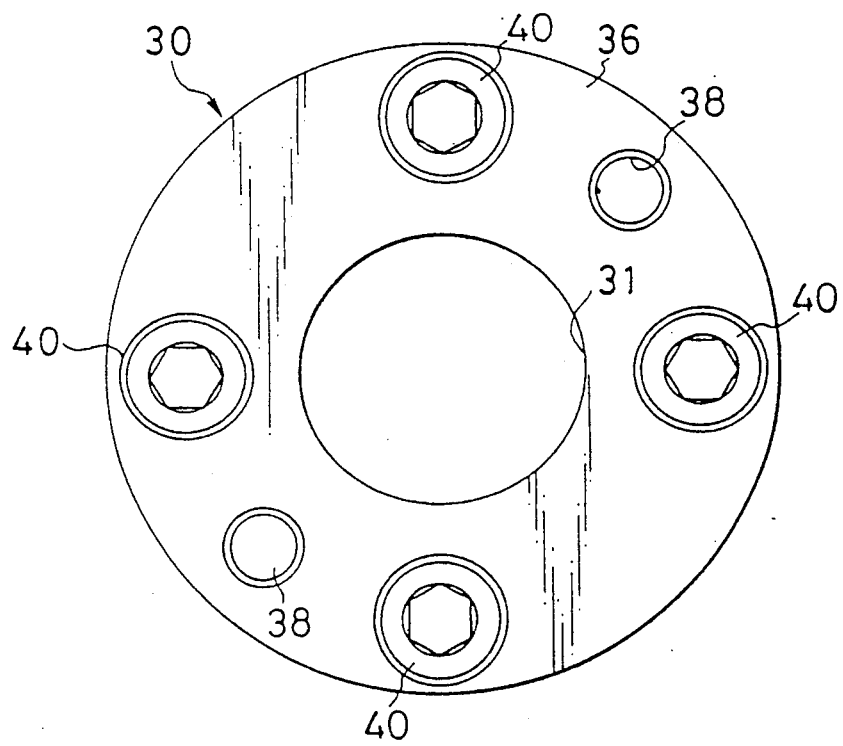
FIG. 2 is a right side view of the fastening apparatus shown in FIG. 1.
Figure 4:
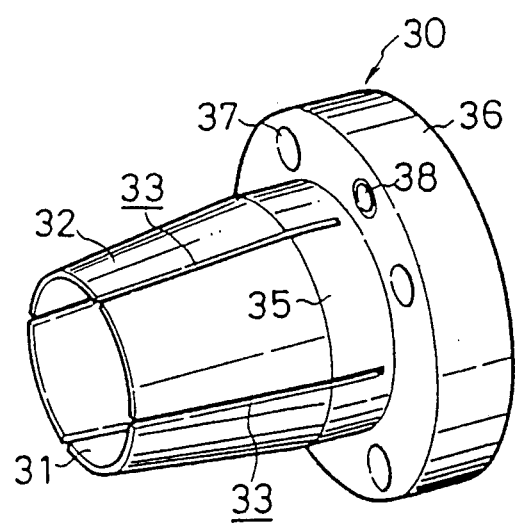
FIG. 4 is a perspective view of an inner ring of the fastening apparatus shown in FIG. 1.
Figure 5:
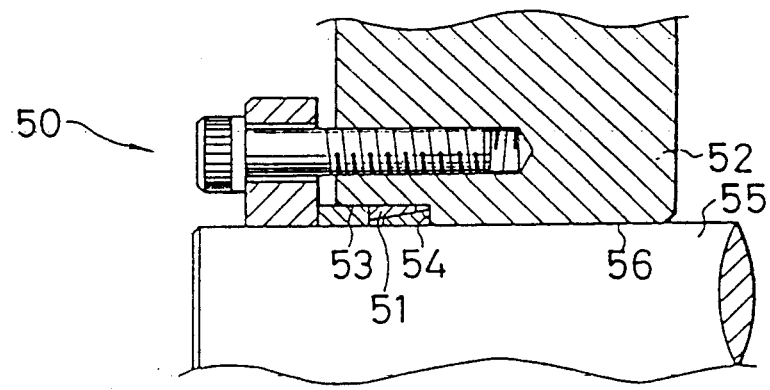
FIGS. 5 and 6 are respectively axial sectional views of conventional fastening apparatus.
Figure 6:
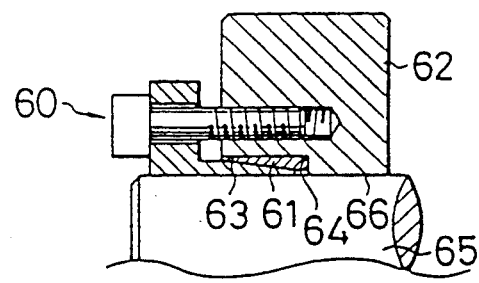

As shown in FIGS. 1 and 4, the inner ring 30 has a cylindrical inner peripheral surface 31 having a diameter larger by scores of microns than the diameter of the shaft 12, and also has a tapered outer peripheral surface 32 complementary to the tapered inner peripheral surface 22 of the outer ring 20. Ring 30 further has a flange portion 36 which is enlarged in diameter and located at the large diameter end of the tapered outer peripheral surface 32. The flange portion 36 is formed with a nonthreaded through axial hole 37 for permitting a bolt 40 to extend therethrough, and a tapped hole 38 for disassembly (see FIG. 2). Axially between the tapered outer peripheral surface 32 and the flange portion 36 is formed a cylindrical outer peripheral surface 35 complementary to the cylindrical inner peripheral surface 25 of the outer ring 20. The diameter of the cylindrical outer peripheral surface 35 is nearly equal to or slightly smaller than the diameter of the cylindrical inner peripheral surface 25 of the outer ring 20. The inner ring 30 has a plurality of axial slits 33. Each of the slits 33 extends axially inwardly from the free end of ring 30 as defined by the small diameter of the tapered outer peripheral surface 32 to a point in the vicinity of the axially facing end surface of the flange portion 36.

The operation for fastening the wheel 14 to the shaft 12 by the aforementioned fastening apparatus 10 is as follows:

The fastening apparatus 10 is inserted between the wheel 14 and the shaft 12, as shown in FIG. 1. Since the seat surface 27 of end flange 26 is in contact with the axial end face of wheel 14, relative movement between outer ring 20 and wheel 14 is impeded. Bolts 40 are inserted through holes 37 into tapped holes 17 and tightened to a predetermined fastening torque. During tightening of bolts 40, the wheel 14 is relatively moved axially toward flange 36 and causes inner ring 30 to be axially moved relatively to the outer ring 20 so that the tapered surfaces 22 and 32 are engaged, and a radial fastening or gripping force is applied on the shaft and on the wheel by the wedge action between rings 20 and 30 and the accompanying resilient radial expansion and contraction of rings 20 and 30, respectively, due to the axial slits 23 and 33. More specifically, between the outer peripheral surface 13 of shaft 12 and the cylindrical inner peripheral surface 31 of inner ring 30, between the inner peripheral surface 16 of the boss hole 15 of wheel 14 and the cylindrical outer surface 21 of outer ring 20, and between the tapered surfaces 22 and 32, fastening forces are generated which act as surface pressure. Accordingly, the shaft 12 and wheel 14 are firmly and hence nonrotatably fastened by the surface pressure, and torque can be transmitted by the frictional force.

At that time, at one axial end of the fastening apparatus 10, the inner peripheral surface 16 of boss hole 15 and the cylindrical outer peripheral surface 21 of outer ring 20 are in contact with each other, and the outer peripheral surface 13 of shaft 12 and the cylindrical inner peripheral surface 24' of the support jaw 24 are in contact with each other. At the other axial end of the fastening apparatus 10, the inner peripheral surface 16 of boss hole 15 and the cylindrical outer peripheral surface 21 of outer ring 20 are in contact with each other, the cylindrical inner peripheral surface 25 of outer ring 20 and the cylindrical outer peripheral surface 35 of inner ring 30 complementary to each other are in contact with each other, and the outer peripheral surface 13 of shaft 12 and the cylindrical inner peripheral surface 31 of inner ring 30 are in contact with each other to function as a guide. Accordingly, the wheel 14 is centered with respect to the shaft 12 at both axial ends of the region in which the fastening force is generated.

The fastening apparatus is disassembled by removing all the bolts 40 from tapped holes 17, screwing the bolts 40 into tapped holes 38 for disassembly to separate the wheel 14 from the inner ring 30, and exerting the separating force. Since the outer ring 20 is provided with the axially extending through slit 23, the outer ring 20 as spread in a fastened state returns (i.e. contracts) to its original shape when the fastening is released, and the outer ring 20 can be easily drawn out.

By applying the function of the shoulder which has been essential in prior art fasteners to a separate outer ring, it is not necessary to machine a shoulder on the boss hole of the wheel or wheel-like body, and hence the boss hole can be a uniform-diameter through hole. Accordingly, machining of the boss hole is easy, and machining of the boss hole with high precision can be achieved. Furthermore, when a wheel or wheel-like body is mounted, attention need not be paid to directivity.

At the small diameter and large diameter ends of the tapered surface, that is, at both ends of the tapered surface, the shaft and the wheel or wheel-like body can be guided to provide for centering thereof.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An arrangement including a wheel-like body having a central boss hole, a shaft projecting into the boss hole, and an apparatus for fastening the wheel-like body to the shaft, the apparatus comprising:

an outer ring having (1) a cylindrical outer peripheral surface fitted into said boss hole, (2) a tapered inner peripheral surface, (3) a support jaw formed at a small diameter end of said tapered inner peripheral surface and fitted over the shaft, (4) a cylindrical inner peripheral surface formed at a large diameter end of said tapered inner peripheral surface, (5) an end jaw of enlarged diameter formed at an end of said outer ring which is opposite from said support jaw, and (6) a slit extending axially thereof;

an inner ring fitted within the outer ring and having (1) a cylindrical inner peripheral surface fitted over said shaft, (2) a tapered outer peripheral surface complementary to the tapered inner peripheral surface of said outer ring, (3) a cylindrical outer peripheral surface formed at the large diameter end of said tapered outer peripheral surface and complementary to the cylindrical inner peripheral surface of said outer ring, (4) a flange portion of enlarged diameter formed at an end of said inner ring on the large diameter side of said tapered outer peripheral surface, (5) axial holes formed through said flange portion, and (6) a slit extending axially thereof; and fasteners extending through said holes and threadedly engaged with tapped holes formed in said wheel-like body.

2. An arrangement according to claim 1, wherein each of said inner and outer rings are of one piece and are respectively resiliently radially contracted and expanded, respectively, when engaged between the shaft and the wheel-like body.

3. An arrangement according to claim 2, wherein the boss hole is defined by an inner annular wall of uniform diameter and extends axially through the wheel-like body, the end jaw having an inner cylindrical surface which directly engages the inner annular wall adjacent one axial side of said wheel-like body, and said end jaw directly engaging the other axial side of said wheel-like body, said end jaw being axially interposed between the flange portion of said inner ring and said wheel-like body.

4. An arrangement according to claim 3, wherein the cylindrical inner peripheral surface on said outer ring is interposed axially between said tapered inner peripheral surface and said end jaw.

5. In combination:
a wheel-like body having a cylindrical hub opening of uniform diameter extending coaxially therethrough, said opening being defined by an annular inner wall;
a shaft projecting coaxially into said hub opening, said shaft being radially spaced from said annular inner wall to define an annular clearance space therebetween; and
a substantially annular fastening apparatus disposed within said clearance space and nonrotatably engaged with said body and said shaft;
said fastening apparatus including an axially elongate inner ring surrounding and engaged with an outer annular surface of said shaft, an axially elongate outer ring surrounding and engaged with both the outer annular wall of said shaft and a portion of said inner ring, said outer ring also being engaged with and surrounded by the inner annular wall of said body;
said inner and outer rings respectively having axially tapered outer and inner peripheral surfaces which are directly engaged and create a wedge-like engagement between said rings, each of said rings having a slit formed radially therethrough and elongated axially thereof for permitting radial deformation of said rings due to the wedge-like engagement therebetween;
said outer ring having a support flange formed at one axial end thereof, said support flange being directly adjacent an end of said tapered inner peripheral surface which is of smallest diameter, said support flange projecting radially inwardly of said smallest diameter and defining thereon a substantially cylindrical inner peripheral wall which is engaged with the outer annular wall of said shaft;
said outer ring having an end flange formed at the other axial end thereof, said end flange being of enlarged diameter and projecting radially outwardly beyond the diameter of said hub opening so as to radially overlap and abut an axial end face of said body;
said inner ring having one axial end thereof disposed axially adjacent said support flange, said one end being defined at an end of said outer tapered surface which is of smallest diameter;
said inner ring having a mounting flange at the other axial end thereof, said mounting flange being spaced axially outwardly of said end face of said body with said end flange being axially interposed therebetween, said mounting flange projecting radially outwardly beyond said end flange; and
threaded fasteners means axially coacting between said mounting flange and said body for axially moving said body and outer ring relative to said inner ring to create the wedge-like engagement between the inner and outer rings and cause radial deformation thereof so that the inner and outer rings respectively grippingly engage the shaft and body.

6. A combination according to claim 5, wherein the inner and outer rings respectively have opposed and directly engaged outer and inner cylindrical peripheral surfaces which are interposed axially between said tapered surfaces and said end flange.

7. A combination according to claim 6, wherein each of said inner and outer rings is of a one-piece construction.

8. A combination according to claim 7, wherein the inner ring has an inner cylindrical peripheral surface of uniform diameter extending axially throughout the length thereof and engaged with the outer annular surface of said shaft; and
said outer ring has an outer cylindrical peripheral surface of uniform diameter extending from said one end of said outer ring to said end flange, said last-mentioned surface being engaged with the annular inner wall of said hub opening.

9. A securing apparatus, such as for fastening a wheel-like body to shaft, comprising:
an outer ring having (1) a cylindrical outer peripheral surface for fitting into a boss hole of a wheel-like body, (2) a tapered inner peripheral surface, (3) a support jaw formed at a small diameter end of said tapered inner peripheral surface for fitting over a shaft, (4) a cylindrical inner peripheral surface formed at a large diameter end of said tapered inner peripheral surface, (5) an end jaw of enlarged diameter formed at an end of said outer ring which is opposite from said support jaw, and (6) a slit extending axially thereof;
an inner ring fitted within the outer ring and having (1) a cylindrical inner peripheral surface for fitting over the shaft, (2) a tapered outer peripheral surface complementary to the tapered inner peripheral surface of said outer ring, (3) a cylindrical outer peripheral surface formed at the large diameter end of said tapered outer peripheral surface and complementary to the cylindrical inner peripheral surface of said outer ring, (4) a flange portion of enlarged diameter formed at an end of said inner ring on the large diameter side of said tapered outer peripheral surface, (5) axial holes formed through said flange portion, and (6) a slit extending axially thereof; and
fasteners extending through said holes for threadedly engaging tapped holes formed in the wheel-like body.

10. A securing apparatus according to claim 9, wherein each of said inner and outer rings are of one piece and are respectively resiliently radially contractible and expandable.

11. A securing apparatus according to claim 10, wherein the cylindrical inner peripheral surface on said outer ring is interposed axially between said tapered inner peripheral surface and said end jaw.

* * * * *